United States Patent [19]

Buss et al.

[11] Patent Number: 5,726,924
[45] Date of Patent: *Mar. 10, 1998

[54] EXPONENTIATION CIRCUIT UTILIZING SHIFT MEANS AND METHOD OF USING SAME

[75] Inventors: John Michael Buss, Tempe; James Douglas Dworkin, Chandler, both of Ariz.; Scott Edward Lloyd, Hoffman Estates; ShaoWei Pan, Schaumburg, both of Ill.; Stephen L. Smith, Chandler, Ariz.; Shay-Ping Thomas Wang, Long Grove, Ill.

[73] Assignee: Motorola Inc., Schaumburg, Ill.

[*] Notice: The term of this patent shall not extend beyond the expiration date of Pat. No. 5,553,012.

[21] Appl. No.: 680,282

[22] Filed: Jul. 11, 1996

Related U.S. Application Data

[63] Continuation of Ser. No. 401,515, Mar. 10, 1995, Pat. No. 5,553,012.

[51] Int. Cl.⁶ .................. G06F 1/02; G06F 7/00; G06F 15/00; G06F 7/50
[52] U.S. Cl. .................. 364/722; 364/748.5; 341/75
[58] Field of Search .................. 364/722, 748, 364/748.5, 715.01, 857, 715.03; 341/75

[56] References Cited

U.S. PATENT DOCUMENTS

| | | | |
|---|---|---|---|
| 3,436,533 | 4/1969 | Moore et al. | 364/748.5 |
| 3,551,663 | 12/1970 | Herron et al. | 235/159 |
| 3,632,996 | 1/1972 | Paine et al. | 364/722 |
| 3,748,451 | 7/1973 | Ingwersen | 235/156 |
| 3,922,536 | 11/1975 | Hampel et al. | 235/152 |
| 3,967,100 | 6/1976 | Shimomura | 235/152 |
| 4,156,922 | 5/1979 | Majerski et al. | 364/757 |
| 4,225,933 | 9/1980 | Monden | 364/722 |
| 4,555,768 | 11/1985 | Lewis, Jr. et al. | 364/748.5 |
| 4,626,825 | 12/1986 | Burleson et al. | 340/347 |
| 4,949,292 | 8/1990 | Hoshino et al. | 364/736 |
| 5,042,001 | 8/1991 | Brightman et al. | 364/736 |
| 5,073,867 | 12/1991 | Murphy et al. | 395/27 |
| 5,184,317 | 2/1993 | Pickett | 364/748.5 |
| 5,220,559 | 6/1993 | Tsuzuki et al. | 370/60 |
| 5,278,945 | 1/1994 | Basehore et al. | 395/27 |
| 5,343,254 | 8/1994 | Wada et al. | 348/627 |

FOREIGN PATENT DOCUMENTS

| | | | |
|---|---|---|---|
| A3 0/218/971 | 9/1986 | European Pat. Off. | G06F 7/552 |
| 59-218550 | 12/1984 | Japan . | |
| WO 87/07053 | 11/1987 | WIPO | G06F 7/552 |
| WO 93/17383 | 9/1993 | WIPO | G06F 7/52 |

OTHER PUBLICATIONS

Computation of the Base Two Logarithm of Binary Numbers by M. Combet et al., IEEE Transactions on Electronic Computers, vol. EC 14, No. 6, Dec., 1965, pp. 863–867.

(List continued on next page.)

*Primary Examiner*—Reba I. Elmore
*Assistant Examiner*—Emmanuel L. Moise
*Attorney, Agent, or Firm*—Michael K. Lindsey; Jeffrey G. Toler

[57] ABSTRACT

A circuit and method for computing an exponential signal $x^g$ is provided. The circuit includes a logarithm converter which converts an input signal to binary word that represents the logarithm of an input signal x. A first shift register shifts the binary word in a bit-wise fashion to produce a first intermediate value; while a second shift register shifts the binary word in a bit-wise fashion to produce a second intermediate value. The shift registers may be implemented using multiplexers. The shifting operations are equivalent to multiplying the intermediate values by a factor which is a power of two. The first intermediate value is either added to or subtracted from the second intermediate value to produce a combined value. An inverse-logarithm converter converts the combined value to the exponential signal.

16 Claims, 10 Drawing Sheets

OTHER PUBLICATIONS

A Logarithmic Vector Processor for Neural Net Applications by Steve Richfield, Neurosoft, IEEE First International Conference on Neural Networks, Sheraton Harbor Island East, San Diego, California, Jun. 21–24, 1987.

A Multiplier–Less Digital Neural Networks by L. Spaaneburg, B. Hoefflinger, S. Neusser, J.A.G. Nijhuis, A. Siggelkow, IMS, Stuttgart, Germany, Proceedings of the 2nd Int'l Conference on Microelectronics for Neural Networks, Oct. 16–18, 1991, Munich, F.R. Germany.

Algorithm Design for a 30 bit Integrated Logarithmic Processor by David M. Lewis and Lawrence K. Yu, Department of Electrical Engineering, University of Toronto, Proceeding 9th Symposium on Computer Arithmetic, 1989, IEEE Comp. Soc. Press, pp. 192–199.

An Architecture for Addition and Subtraction of Long Word Length Numbers in the Logarithmic Number System by David M. Lewis, Member, IEEE, IEEE Transactions on Computers, vol. 39, No. 11, Nov. 1990, pp. 1325–1336.

A 30–b Integrated Logarithmic Number System Processor by Lawrence Processor K. Yu, Member, IEEE, and David M. Lewis, Member, IEEE, IEEE Journal of Solid–State Circuits, vol. 26, No. 10, Oct. 1991, pp. 1433–1440.

An Accurate LNS Arithmetic Unit Using Interleaved Memory Function Interpolar by David M. Lewis, Department of Electrical Engineering, University of Toronto, Proceeding 11th Symposium on Computer Arithmetic, 1993, IEEE Comp. Soc. Press, pp. 2–9.

Interleaved Memory Function Interpolars with Application to an Accurate LNS Arithmetic Unit by David M. Lewis, Member, IEEE, IEEE Transactions on Computers, vol. 43, No. 8, Aug. 1994, pp. 974–982.

Table–Lookup Algorithms for Elementary Functions and Their Error Analysis by Ping Tak Peter Tang, Matematics and Computer Science Division, Argonne National Laboratory, 9700 S. Cass Ave., Argonne, IL 60439–4801, Proceeding 10th Symposium on Computer Arithmetic, Jun. 1991, pp. 232–236.

Applying Features of IEEE 754 to Sign/Logarithm Arithmetic by Mark G. Arnold, Member, IEEE, Thomas A. Bailey, Member, IEEE, John R. Cowles, and Mark D. Winkel, IEEE Transactions on Computers, vol. 41, No. 8, Aug. 1992, pp. 1040–1050.

D8.13 Improved Accuracy for Logarithmic Addition in DSP Applications by Mark G. Arnold, John Cowles, and Thomas Bailey, Computer Science Department, University of Wyoming, Laramine, WY, ICASSP 88:Int. Conf. on Acoustics, Speech and Signal Processing, vol. 3 pp. 1714–1717.

Redundant Logarithmic Number Systems by M.G. Arnold, T.A. Bailey, J.R. Cowles, J.J. Cupal, University of Wyoming, Laramine, WY, Proceeding of 9th Symposium on Computer Arithmetic, pp. 144–151, IEEE Comp. Soc. Press.

Comments on "An Architecture for Addition and Subtraction of Long Word Length Numbers in the Logarithmic Number System" by M. Arnold, T. Bailey and J. Cowles, IEEE Transactions on Computers, vol. 41, No. 6, Jun. 1992, pp. 786–788.

Redundant Logarithmic Arithmetic, Mark G. Arnold, Member IEEE, Thomas A. Bailey, Member IEEE, John R. Cowles, and Jerry J. Cupal, Members IEEE,IEEE Transactions on Computers, vol 39, No. 8, Aug. 1990, pp. 1077–1086.

The Efficient Implementation and Analysis of a Hybrid Number System Processor, Fang–shi Lai, IEEE Transactions on Circuits and Systems, II: Analog and Digital Signal Processing. vol. 40, NO. 6, Jun. 1993, pp. 382–392.

Polynomial and Standard Higher Order Neural Network. Chir–Ho Chang, Jin–Ling Lin, and J.Y. Cheung, Electrical Engineering and Computer Science, University of Oklahoma, 1993 IEEE International Conference on Neural Networks, Mar. 28–Apr. 1, 1993, pp. 989–994.

A Digital Neuron–Type Processor and Its VLSI Design, Mahmoud K. Habib, Member, IEEE, and H. Akel, 8090 IEEE Transactions on Circuits and Systems 36(1989) May, No. 5, New York, US, pp. 739–746.

A Neural Feed–Forward Network with a Polynomial Nonlinearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep. 2, 199?, pp. 49–58.

A Polynomial time Algorithm for Generating Neural Networks for Classification Problems, Asim Roy and Sonnath Mukhopadhyay, Dept. of Decision and Information Systems, Arizona State University, IJCNN, 1992, 0–7803–0559–0/92 IEEE, pp. I–147–I–152.

Modeling systems with Polynomial Networks, Tools for Predicting Behavior, Peter D. Varhol, Programmer's Workbench, Dr. Dobb's Journal, Sep. 1993, Begins on page 76.

AIM Outperforms Neural Networks and Regression, Mark Shewhart, USAF (IEEE Spectrum), AbTech Corporation, Charlotteville, VA 22903.

Polynomial Functions Can Be Realized by Finite Size Multilayer Feedforward Neural Networks, Naohiro TODA, Ken–ichi FUNAHASHI and Shiro USUI, Department of Information and Computer Sciences, Toyohashi University of Technology, Tempaku, Toyohashi 441, Japan, 1991 IEEE International Joint Conference on Neural Networks, vol. 1of3. The Westin Stamford and Westin Plaza, 18–21, Nov. 1991, Singapore.

An Artificial Neural Networks for Approximating Polynomial Functions, Behnam Malakooti and YingQing Zhou, Deptarment of Ssytems Engineering, Center for Automation and Intelligent Systems Research University, Cleveland, Ohio.International Joint Conference on Neural Networks, Jun. 1992, pp. III–966–III–971.

Recursive Reduction in Finite Ring Computations, D. Zhang, G.A. Jullien, W.C. Miller, VLSI Research Group, Department of Electrical Engineering, University of Windsor, Windsor, Ontario Canada N9B 3P4, Twenty–Third Asilomar conf. on Signals, systems and Computers, Conference Record vol. 2of2. pp. 854–857.

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Backpropagation Based on the Logarithmic Error Function and Elimination of Local Minima, Kiyotoshi Matsuoka and Jianqiang Yi, Department of Control Engineering, Kyushu Institute of Technology, Sensul 1–1, Tobata, Kitakyushu, 804 Japan, CH3065–0/91/0000–1117 IEEE, of Technology, Sensul 1–1, Tobata, Kitakyushu, 804 Japan, CH3065–0/91/0000–1117 IEEE, pp. 1117–1122.

Output Weight Optimization for the Multi–Layer Perceptron by M.T. Manry, Xiujun Guan, S.J. Apollo, L.S. Allen, W.D. Lyle, and W. Gong, Department of Electrical Engineering, University of Texas at Arlington, Arlington, Texas, Conference Record of the Twenty Sixth Asilomar conf. on Signals, Systems and Computers, Oct. 26–28, 1992, pp. 502–506.

Highly–automated, Non–parametric statistical learning for autonomous target recognition, Keith C. Drake, AbTech Corp., 700 Harris St., Charlottesville, VA, 22903, pp. 1–10, Proc. of the SPI 20th Applied Imagery Pattern Recognition Workshop, Oct. 1991, McLean, VA.

Generalization and Learning in Volterra and Radical Basis Function Networks: A Theoretical Analysis, Sean B. Holden and Peter J.W. Rayner, Cambridge Univ. Engr. Dept., Trumpington St., Cambridge CB2 1PS, U.K., 0–7803–0532–9/92, 1992, IEEE, pp. II–273–II–276.

On the Design Principles of the Functional Link Nets, Jun Wang and Edilberto P. Teixeira, Dept. of Systsms Engr., Case Western Reserve Univ., Cleveland, Ohio, 44106, pp. 613–616, IEEE Int'l Conf. on Systems Engr., Aug. 9–11, 1990, Vista Int'l Hotel, Pittsburgh, PA, IEEE Catalog No:90CH2872–0.

A 10–ns Hybrid Number System Data Execution Unit for Digital Signal Processing Systems by Fang–shi Lai, IEEE Journal of Solid–State Circuits, vol. 26, No. 4, Apr. 1991, pp. 590–599.

A Hybrid Number System Processor with Geometric and Complex Arithmetic Capabilities by Fang–shi Lai, and Ching–Farn Eric Wu, IEEE Transactions on Computers, vol. 40, No. 8, Aug. 1991, pp. 952–960.

A 3.84 GIPS Integrated Memory Array Processor with 64 Processing Elements and a 2–Mb SRAM by Nobuyuki Yamashita et al., IEEE Journal of Solid–State Circuits, vol. 29, No. 11, Nov. 1994, pp. 1336–1343.

FIG. 3

| EXPONENT CODE | EXPONENT SIGNAL | COMBINED VALUE | OPERATION OF ADDER | OPERATION OF P/I UNIT | OPERATION OF P/Z UNIT | SHIFTER 2 | SHIFTER 1 | CARRY BIT |
|---|---|---|---|---|---|---|---|---|
| 000 | $X^{-1}$ | -LOGX | -LOGX+0 | INVERT | ZERO | 0 | 0 | 1 |
| 001 | $X^1$ | LOGX | LOGX+0 | PASS | ZERO | 0 | 0 | 0 |
| 010 | $X^2$ | 2LOGX | 2LOGX+0 | PASS | ZERO | 1 LEFT | 0 | 0 |
| 011 | $X^3$ | 3LOGX | 2LOGX+LOGX | PASS | PASS | 1 LEFT | 0 | 0 |
| 100 | $X^4$ | 4LOGX | 4LOGX+0 | PASS | ZERO | 2 LEFT | 0 | 0 |
| 101 | $X^5$ | 5LOGX | 4LOGX+LOGX | PASS | PASS | 2 LEFT | 0 | 0 |
| 110 | $X^6$ | 6LOGX | 4LOGX+2LOGX | PASS | PASS | 2 LEFT | 1 LEFT | 0 |
| 111 | $X^7$ | 7LOGX | 8LOGX-LOGX | INVERT | ZERO | 3 LEFT | 0 | 1 |

FIG.4

| EXPONENT CODE | EXPONENT SIGNAL | COMBINED VALUE | OPERATION OF ADDER | OPERATION OF P/I UNIT | OPERATION OF P/Z UNIT | SHIFTER 2 | SHIFTER 1 | CARRY BIT |
|---|---|---|---|---|---|---|---|---|
| 000 | $x^{-1}$ | $-\text{LOG}X$ | $-\text{LOG}X+0$ | INVERT | ZERO | 0 | 0 | 1 |
| 001 | $x^{-1/2}$ | $-0.5\text{LOG}X$ | $-\text{LOG}X+0.5\text{LOG}X$ | INVERT | PASS | 0 | 1 RIGHT | 1 |
| 010 | $x^{1/2}$ | $0.5\text{LOG}X$ | $0.5\text{LOG}X+0$ | PASS | ZERO | 1 RIGHT | 0 | 0 |
| 011 | $x^1$ | $\text{LOG}X$ | $\text{LOG}X+0$ | PASS | ZERO | 0 | 0 | 0 |
| 100 | $x^2$ | $2\text{LOG}X$ | $2\text{LOG}X+0$ | PASS | ZERO | 1 LEFT | 0 | 0 |
| 101 | $x^3$ | $3\text{LOG}X$ | $2\text{LOG}X+\text{LOG}X$ | PASS | PASS | 1 LEFT | 0 | 0 |
| 110 | $x^4$ | $4\text{LOG}X$ | $4\text{LOG}X+0$ | PASS | ZERO | 2 LEFT | 0 | 0 |
| 111 | $x^5$ | $5\text{LOG}X$ | $4\text{LOG}X+\text{LOG}X$ | PASS | PASS | 2 LEFT | 0 | 0 |

FIG. 7

| EXPONENT CODE | EXPONENT SIGNAL | MUX SIGNAL 1 | MUX SIGNAL 2 | ADDER ENABLE | MUX SIGNAL 3 | CARRY BIT |
|---|---|---|---|---|---|---|
| 000 | $x^{-1}$ | X | INVERT | 0 | MUX 2 OUTPUT | 1 |
| 001 | $x^{-1/2}$ | 1 RIGHT | INVERT | 1 | ADDER 1 OUTPUT | 1 |
| 010 | $x^{1/2}$ | 1 RIGHT | X | 0 | MUX 1 OUTPUT | 0 |
| 011 | $x^1$ | PASS | X | 0 | MUX 1 OUTPUT | 0 |
| 100 | $x^2$ | 1 LEFT | X | 0 | MUX 1 OUTPUT | 0 |
| 101 | $x^3$ | 1 LEFT | PASS | 1 | ADDER 1 OUTPUT | 0 |
| 110 | $x^4$ | X | 2 LEFT | 0 | MUX 2 OUTPUT | 0 |
| 111 | $x^5$ | PASS | 2 LEFT | 1 | ADDER 1 OUTPUT | 0 |

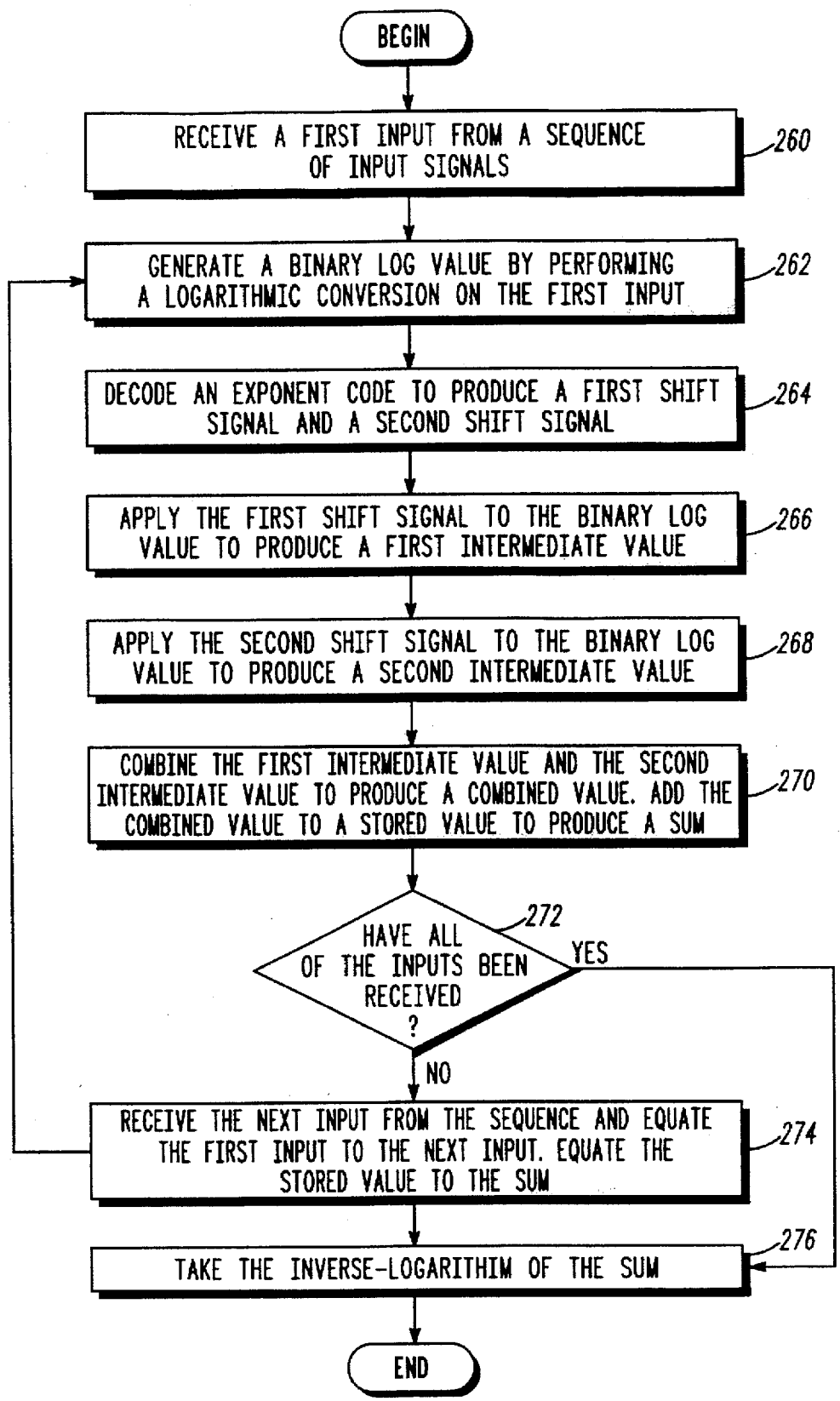

EXPONENTIATION CIRCUIT UTILIZING SHIFT MEANS AND METHOD OF USING SAME

RELATED INVENTIONS

This is a continuation of application Ser. No. 08/401,515, filed on 10 Mar. 1995 now patented Sep. 3, 1996, U.S. Pat. No. 5,553,012.

The present invention is related to the following inventions which are assigned to the same assignee as the present invention:

(1) "Neural Network Utilizing Logarithmic Function and Method of Using Same", having Ser. No. 08/176,601, filed on Jan. 3, 1994.

(2) "Logarithm/Inverse-Logarithm Converter Utilizing Second-Order Term and Method of Using Same", having Ser. No. 08/382,467, filed on Nov. 31, 1995.

(3) "Computer Processor Utilizing Logarithmic Conversion and Method of Use Thereof", having Ser. No. 08/403,158, filed on Mar. 13, 1995.

The subject matter of the above-identified related inventions is hereby incorporated by reference into the disclosure of this invention.

TECHNICAL FIELD

The present invention relates generally to electronic circuits and, in particular, to a circuit for generating an exponential signal in response to an input signal.

BACKGROUND OF THE INVENTION

It is quickly becoming a common task in digital computers to compute exponential values, $x^g$. Exponential values are used in a wide variety of computer applications, such as non-linear control, digital signal processing, simulation, and encryption. However, conventional techniques for computing exponential values present several disadvantages.

One approach commonly used for computing exponential values is to provide a binary multiplier circuit as part of the computer. In fact, many of today's microprocessors include one or more multipliers in their core logic. Typically, the multipliers are capable of multiplying two operands at a time. To compute an exponential value $x^g$, the input value, x, is presented to both inputs of the multiplier. In turn, the multiplier produces an output of $x^2$. If a higher order exponential value is desired, for instance, $x^9$, the output of the multiplier is fed back to one or both of the multiplier inputs and the multiplication-feedback cycle is repeated until the desired exponential value is computed.

This approach has several drawbacks. First, conventional binary multiplier circuits require relatively large amounts of space in an integrated circuit. Furthermore, they are typically slow, in some cases requiring a large number of clock cycles to complete a single multiplication, and they usually consume a large amount of power when compared to other arithmetic circuits, such as adders. Another limitation of this approach is that it requires additional multiplication cycles to compute exponential values having a power greater than two. For example, computing an exponential value of $x^{16}$ would require a minimum of four multiplication cycles using a single multiplier circuit. Consequently, such a computation would dramatically decrease the throughput of a computer.

Another known technique for computing exponential values is to provide an analog circuit which determines an exponential value from an analog input value. Typically, the exponential value is also an analog signal which must be converted to a binary word by an analog-to-digital converter before being used by a computer. Although analog exponentiation circuits usually require less time to compute an exponential value than the above-described technique of recursively multiplying binary words, they are generally expensive and difficult to integrate with a digital computer.

In essence, there is a need for a device to compute an exponential value, wherein the device computes an exponential value in substantially less time, require less space and power on an integrated circuit, and integrates more economically with a digital computer than the conventional techniques described above.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 3 is a table illustrating examples of exponent codes which can be used with the exponentiation circuit of FIG. 2.

FIG. 4 is a second table illustrating alternative examples of exponent codes which can be used with the exponentiation circuit of FIG. 2.

FIG. 7 is a table illustrating examples of exponent codes which can be used with the exponentiation circuit of FIG. 6.

FIG. 11 illustrates a flow diagram of a method of generating a term which includes a plurality of exponential signals generated from a sequence of inputs.

DETAILED DESCRIPTION OF THE PREFERRED EMBODIMENTS

It is an advantage of the present invention to provide an exponentiation circuit having a high data throughput rate. Another advantage of the present invention is to provide an exponentiation circuit which requires substantially less power and space on an integrated circuit. A further advantage of the present invention is to provide an exponentiation circuit which is economical to implement and easy to integrate with a microprocessor core or other digital logic on a single chip.

Generally, the present invention provides circuit for computing an exponential signal from an input signal. This is accomplished by using a logarithm converter to generate a binary log value from an input signal. A shift register then shifts the bits of the binary log value to generate an intermediate value. The shifting operation is equivalent to multiplying the binary log value by a factor which is a power of two. The intermediate value is then combined with a stored value, and the exponential signal is generated by performing an inverse-logarithmic conversion on the combined value.

Figure 1:
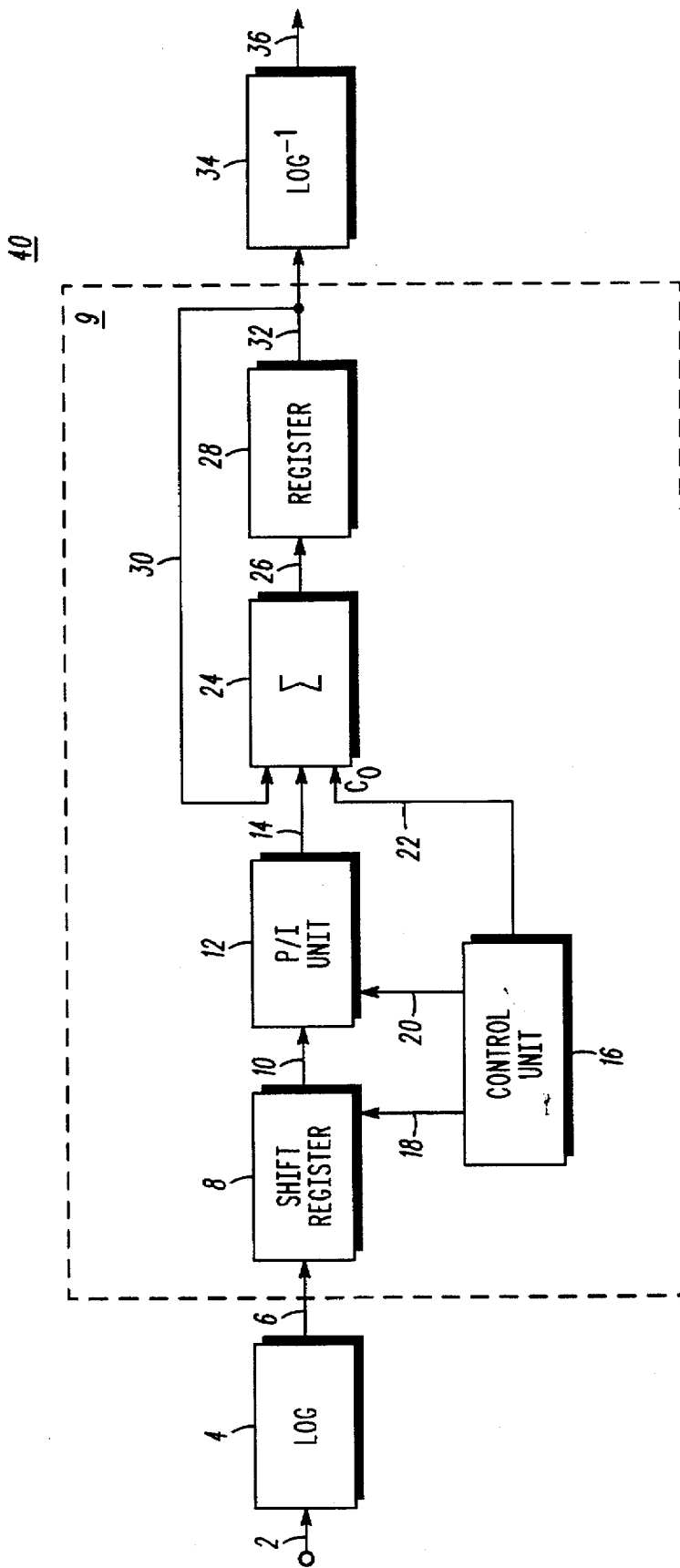
FIG. 1 illustrates a block diagram of an exponentiation circuit in accordance with one embodiment of the present invention.

FIG. 1 illustrates a block diagram of an exponentiation circuit 40 in accordance with one embodiment of the present invention. The exponentiation circuit 40 comprises a log circuit 4, a compute element 9, and an inverse-log circuit 34. The compute element 9 includes a shift register 8, a P/I unit 12, an adder circuit 24, a register 28, and a control unit 16. The log circuit 4 receives input signals on its input 2 and converts each input signal to a binary log value 6 which has a plurality of bits. Upon receiving a binary log value 6, the shift register 8 performs an arithmetic shift on the input to generate an intermediate value 10. The distance of the shift is determined by a shift signal 18 which is produced by the control unit 16. After receiving the intermediate value 10, the P/I unit 12 either passes the intermediate value 10 to bus 14 or inverts the intermediate value 10 and then passes the inverted value to bus 14. The function of the P/I unit 12 is determined by a control signal 20 which is provided by the control unit 16. The adder circuit 24 sums a stored value, received across feedback path 30, the value provided on bus 14, and a carry bit 22 to produce a combined value on output 26. The combined value is stored in the register 28. The register 28 provides the combined value on a bus 32 to the inverse-log circuit 34 and as the stored value on the feedback path 30. The inverse-log circuit 34 produces the exponential signal on output 36 by taking the inverse-logarithm of the combined value.

The log circuit 4 may be any means which converts an input signal to a binary value representing the logarithm of the input signal. For example, the log circuit may be an analog circuit which includes an amplifier having a logarithmic transfer function and an analog-to-digital converter which converts the output of the amplifier to a binary word. In such an example, the input signal could be a current or voltage which varies continuously over the dynamic range of the amplifier. However, in a preferred embodiment, the log circuit 4 includes a log converter as disclosed in above-identified Related Invention No. 2. This log converter receives input signals represented by IEEE standard 32-bit floating point values and implements a second-order polynomial to generate binary log values having an 8-bit integer portion and a 23-bit fractional portion. The sign bit of each input signal is passed (not shown) directly to the inverse-log circuit 34 where it is then recombined with the corresponding exponential signal, which is also represented by an IEEE standard 32-bit floating point value.

The inverse-log circuit 34 may be any means which receives as input a binary word and produces as output the inverse-logarithm of the binary word. However, in a preferred embodiment, the inverse-log circuit 34 includes an inverse-logarithm converter as disclosed in above identified Related-Invention No. 2. This inverse-log converter receives both the fractional and integer portions of the combined values and, in turn, generates exponential signals that are represented by IEEE 32-bit floating point values. Such an inverse-log converter includes a means (not shown) for recombining a floating point exponential signal with its respective sign bit.

In a preferred embodiment, the log circuit 4, compute element 9, and inverse-log circuit 34 are implemented on a single integrated circuit. However, one of ordinary skill in the art will realize that either the log circuit 4 or the inverse-log circuit 34 may be implemented in many other ways and still conform to the teachings of the present invention. For instance, either circuit may be implemented as software running on a general purpose processor, such as a microprocessor, or either may be implemented as a standalone analog circuit. Furthermore, one of ordinary skill will appreciate that the logarithmic and inverse-logarithmic conversions may be based on any number system.

The shift register 8 is used to shift the values it receives in a bit-wise fashion. The shifting operation is equivalent to either multiplying or dividing the binary log value 6 by a factor which is a power of two. The shifted result is the intermediate value 10. Although an embodiment of the present invention does not place any limits on the bit distance which a value may be shifted, a preferred embodiment provides that the shift register 8 can shift a binary log value a bit distance in the range of 0 to 3 bits. The distance that each binary log value 6 is shifted is determined by shift signal 18 which is provided by control unit 16. By shifting the bits of the binary log value 6 toward the most significant bit (MSB) of the value (typically to the left), the shift register 8 produces the intermediate value 10 which is multiplied by a factor that is a power of two. On the other hand, by shifting the bits of the binary log value 6 toward the least significant bit (LSB) of the value (typically to the right), the shift register 8 produces the intermediate value 10 which is divided by a factor that is a power of two. Thus, when the shift register 8 shifts a value to the left, the exponentiation circuit 40 produces an exponential signal having an integer exponent, such as $x^2$, $x^4$, etc., where x represents the input signal; while shifting to the right produces an exponential signal having a fractional exponent such as $x^{1/2}$, $x^{1/4}$, etc., where x represents the input signal.

The P/I unit 12 inverts the intermediate value 10 in response to the control signal 20 from the control unit 16. By causing the P/I unit 12 to invert the intermediate value 10 and by providing a carry bit 22 corresponding to the inverted value, the control unit 16 converts the intermediate value 10 to its two's complement form, thus allowing the adder circuit 24 to subtract the converted intermediate value, available on bus 14, from the stored value.

The adder circuit 24 and the register 28 function together to allow a sequence intermediate values to be accumulated. In addition, the register 28 can be pre-loaded with a value, such as coefficient value. The adder circuit 24 sums the values it receives on the bus 14 and the feedback path 30 to generate combined values which are in turn stored in the register 28. A combined value is simply the sum of the values provided on the two inputs of the adder circuit 24. The stored value provided on the feedback path 30 is the contents of the register 28.

The control unit 16 typically stores a plurality of exponent codes (not shown), wherein each exponent code corresponds to an input signal. As each input signal is received by the exponentiation circuit 40, the control unit 16 decodes a corresponding exponent code to generate the shift signal 18, the control signal 20, and the carry bit 22, all of which correspond to the input signal. However, in another version of the present invention, the exponent codes are provided by a means of generating the codes which is connected to the control unit 16 and yet separate from the exponentiation circuit 40, such as a separate memory for storing the exponent codes or a host processor, e.g. a microprocessor connected to the circuit.

In operation, the exponentiation circuit 40 can compute an exponent signal for a single input signal or a term which includes a plurality of exponent signals computed from a sequence of input signals. In either case, computing an exponent signal from a single input signal may require one or more addition cycles. This is accomplished by providing an additional storage means (not shown) for storing the binary log value 6 while the addition cycles execute and providing the stored binary log value to the P/I unit 12 during each cycle. Such a storage means may be incorporated in either the log circuit 4 or in the shift register 8.

The operation of the exponentiation circuit 40 may be illustrated by considering an example of computing an exponential signal of $x^7$, where x represents an input signal. The computation of $x^7$ requires two addition cycles. During each cycle, the shift register 8 provides a different intermediate value 10.

During the first addition cycle, the input signal, x, is converted to a binary log value 6 by the log circuit 4 and provided to the additional storage means and the shift register 8. The control unit generates the shift signal 18 so that the shift register 8 shifts the binary log value 6 a distance of three bits, thus producing an intermediate value 10 which is a multiple of eight of the binary log value 6. The control unit 16 also generates the control signal 20 so that the intermediate value 10 is passed unaffected through the P/I unit 12 to the adder circuit 24 via bus 14. The adder circuit 24 then sums the intermediate value 10 with the value stored in the register 28, which value is provided by feedback path 30. Initially, the stored value may be set to zero or a coefficient value. The contents of the register 28 are then updated to the combined value which is provided on the output 26 of the adder circuit 24.

During the second addition cycle, the control unit 16 generates the carry bit 22 and the shift signal 18 so that the shift register 8 passes the stored binary log value without shifting it. The control unit 16 also generates the control signal 20 so that the P/I unit 12 inverts the intermediate value 10. As a result of the inversion, the adder circuit 24, in effect, subtracts the intermediate value 10 from the stored value provided on the feedback path 30 to produce a final combined value which is a multiple of seven of the binary log value 6. The final combined value is then stored in the register 28 and provided to the inverse-log circuit 34 on bus 32. The inverse-log circuit 34 produces the exponential signal, $x^7$, by performing an inverse-logarithmic conversion on the stored value.

Figure 2:
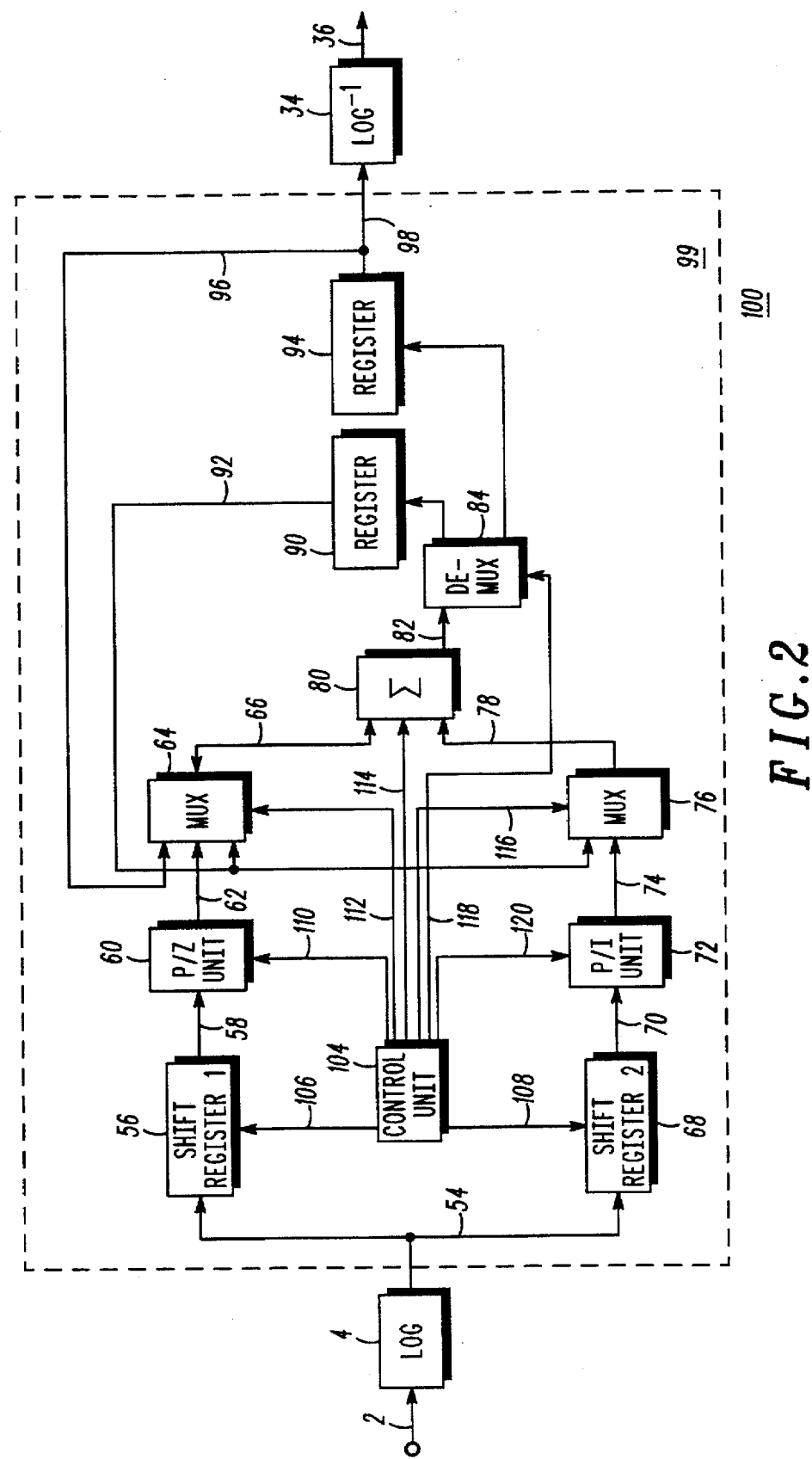
FIG. 2 illustrates a block diagram of an exponentiation circuit in accordance with another embodiment of the present invention.

FIG. 2 illustrates a block diagram of an exponentiation circuit 100 in accordance with another embodiment of the present invention. The exponentiation circuit 100 performs the same function as the exponentiation circuit 40 shown in FIG. 1 in that it computes a term which includes one or more exponential signals. However, the exponentiation circuit 100 includes an additional shift register, and thus requires fewer addition cycles than the exponentiation circuit 40 of FIG. 1. The exponentiation circuit 100 comprises a log circuit 4, a compute element 99, and an inverse-log circuit 34. The compute element 99 includes a P/I unit 72, a P/Z unit 60, a first shift register 56, a second shift register 68, a first multiplexer 64, a second multiplexer 76, an adder circuit 80, a de-multiplexer 84, a first register 94, a second register 90, and a control unit 104.

The log circuit 4 receives one or more input signals on its input 2 and converts each input signal to a binary log value which has a plurality of bits. The binary log value is then distributed by bus 54 to the first shift register 56 and the second shift register 68. Upon receiving a binary log value, the first shift register 56 performs an arithmetic shift on the value to generate a first intermediate value on bus 58. The distance of the shift is determined by a first shift signal 106 which is produced by the control unit 104. The second shift register 68 performs an arithmetic shift on the binary log value to generate a second intermediate value on bus 70. The distance of the shift is determined by a second shift signal 108 which is produced by the control unit 104. Both the first shift register 56 and the second shift register 68 may shift binary log values either to the right or left.

After receiving an input on bus 70, the P/I unit 72 either passes the second intermediate value to bus 74 or inverts the intermediate value and then passes the inverted value to bus 74. The function of the P/I unit 72 is determined by a second control signal 120 which is provided by the control unit 104. The P/Z unit 60 either passes the first intermediate value or zero to bus 62, depending on the value of a first control signal 110 which is provided by the control unit 104.

A first multiplexer 64 couples to its output 66 to either the bus 62, a feedback bus 96, or the output 92 of the second register 90. The output 66 of the first multiplexer 64 is determined by a first mux signal 112 provided by the control unit 104. A second multiplexer 76 couples to its output 78 to either the bus 74, or the output 92 of the second register 90. The output 78 of the second multiplexer 76 is determined by a second mux signal 116 provided by the control unit 104.

The adder circuit 80 sums the outputs 66 and 78 of the first and second multiplexers 64, 76. The de-multiplexer 84 provides the output 82 of the adder circuit 80 to either the second register 90 or the first register 94, depending on the value of the de-mux signal 118. The first register 94 provides its contents, which is a sum, on feedback bus 96 and output 98, while the second register provides its contents as a combined value on its output 92. The inverse-log circuit 34 generates a term, which represents one or more exponential signals, on output 36 by taking the inverse-logarithm of the sum.

The control unit 104 typically stores a plurality of exponent codes (not shown), where each exponent code corresponds to an input signal. As each input signal is received by the exponentiation circuit 100, the control unit 104 decodes a corresponding code to generate the first and second control signals 110, 120; the first and second shift signals 106, 108; the first and second mux signals 112 and 116, de-mux signal 118, and a carry bit 114. However, in other versions of the present invention, the exponent codes are provided by a means of generating the codes which is connected to the control unit 104 and yet separate from the exponentiation circuit 100, such as a separate memory for storing the exponent codes or a host processor, e.g. a microprocessor connected to the circuit.

In operation, the exponentiation circuit 100 can compute an exponent value for a single input signal or a term which includes a plurality of exponent signals computed from a sequence of input signals. In either case, computing an exponent signal from a single input signal requires only one addition cycle in a preferred embodiment. However, computing a term which includes a plurality of exponent value requires two addition cycles for every input signal. This is explained as follows. When an input signal is received, the result of the first addition cycle is stored in the second register 90 as the combined value. This is accomplished by the control unit 104 asserting the first and second mux signals 112, 116 so that the outputs of the P/I unit 72 and the P/Z unit 60 are provided to the adder circuit 80. In addition, the control unit 104 asserts the de-mux signal 118 to select the second register 90.

During the second cycle, a stored value and the combined value are provided to the inputs of the adder circuit 80 via the feedback bus 96 and the output 92, respectively. The sum produced by the second addition cycle then updates the stored value in the first register 94. The second cycle is accomplished by the control unit 104 asserting the first and second mux signals 112, 116 so that the output 92 and the feedback bus 96 are provided as inputs to the adder circuit 80. The control unit 104 then asserts the de-mux signal 118 to select the first register 94 so that the result of the cycle is placed in the first register 94.

In operation, the stored value in the first register 94 is typically the sum of the intermediate values generated from preceding input signals in a sequence. Initially, however, the stored value may be a coefficient value which is the logarithm of a constant. The first and second registers 94, 90 may also be preset to zero.

FIG. 3 is a table illustrating examples of exponent codes which can be used with the exponentiation circuit 100 of FIG. 2. The table lists the codes and their corresponding control and shift signals which are used in a preferred embodiment of the present invention. The table also illustrates the operations of the adder circuit 80 and the value of the carry bit 114 in response to the each of the exponent codes. Each row in the table gives the values of the signals and the carry bit corresponding to one of the exponent codes.

For example, in the first row, the exponent code "000" indicates that $x^{-1}$ is to be generated by exponentiation circuit 100. If the exponent code for an input signal is "000", then the second intermediate value is equated to the binary log value, the first intermediate value is set to zero, and the combined value is produced by subtracting the second intermediate value from the first intermediate value.

In the second row, the exponent code "001" indicates that $x^1$ is to be generated. If the exponent code is "001" for an input signal, then the second intermediate value is equated to the binary log value, the first intermediate value is set to zero, and the combined value is produced by adding the second intermediate value to the first intermediate value.

In the third row, the exponent code "010" indicates that $x^2$ is to be generated. If the exponent code is "010" for an input signal, then the exponent code indicates that $x^2$ is to be generated, then the second intermediate value is generated by shifting the binary log value a distance of one bit to the left, the first intermediate value is set to zero, and the combined value is produced by adding the second intermediate value to the first intermediate value.

In the forth row, the exponent code "011" indicates that $x^3$ is to be generated. If the exponent code is "011" for an input signal, then the second intermediate value is generated by shifting the binary log value a distance of one bit to the left, the first intermediate value equated to the binary log value, and the combined value is produced by adding the second intermediate value to the first intermediate value.

In the fifth row, the exponent code "100" indicates that $x^4$ is to be generated. If the exponent code is "100" for an input signal, then the second intermediate value is generated by shifting the binary log value a distance of two bits to the left, the first intermediate value is set to zero, and the combined value is produced by adding the second intermediate value to the first intermediate value.

In the sixth row, the exponent code "101" indicates that $x^5$ is to be generated. If the exponent code for an input signal is "101", then the second intermediate value is generated by shifting the binary log value a distance of two bits to the left, the first intermediate value is equated to the binary log value, and the combined value is produced by adding the second intermediate value to the first intermediate value.

In the seventh row, the exponent code "110" indicates that $x^6$ is to be generated. If the exponent code for an input is "110", then the second intermediate value is generated by shifting the binary log value a distance of two bits to the left, the first intermediate value is generated by shifting the binary log value a distance of one bit to the left, and the combined value is produced by adding the second intermediate value to the first intermediate value.

In the eighth row, the exponent code "111" indicates that $x^7$ is to be generated. If the exponent code for an input signal is "111", then the second intermediate value is equated to the binary log value, the first intermediate value is generated by shifting the binary log value a distance of three bits to the left, and the combined value is produced by subtracting the second intermediate value from the first intermediate value.

FIG. 4 is a first table illustrating alternative examples of exponent codes which can be used with the exponentiation circuit of FIG. 2. The table lists the codes and their corresponding control and shift signals. The table also illustrates the operations of the adder circuit 80 and the value of the carry bit 114 in response to the each of the exponent codes. Each row in the table gives the values of the signals and the carry bit corresponding to one of the exponent codes.

For example, in the first row, the exponent code "000" indicates that $x^{-1}$ is to be generated by exponentiation circuit 100. If the exponent code for an input signal is "000", then the second intermediate value is equated to the binary log value, the first intermediate value is set to zero, and the combined value is produced by subtracting the second intermediate value from the first intermediate value.

In the second row, the exponent code "001" indicates that $x^{-\frac{1}{2}}$ is to be generated. If the exponent code is "001" for an input signal, then the second intermediate value is generated by shifting the binary log value one bit to the right, the first intermediate value is set to the binary log value, and the combined value is produced by subtracting the first intermediate value from the second intermediate value.

In the third row, the exponent code "010" indicates that $x^{-\frac{1}{2}}$ is to be generated. If the exponent code is "010" for an input signal, then the second intermediate value is shifted one bit to the right, the first intermediate value is set to zero, and the combined value is produced by adding the second intermediate value to the first intermediate value.

In the fourth row, the exponent code "011" indicates that $x^1$ is to be generated. If the exponent code is "011" for an input signal, then the second intermediate value is equated to the binary log value, the first intermediate value is set to zero, and the combined value is produced by adding the second intermediate value to the first intermediate value.

In the fifth row, the exponent code "100" indicates that $x^2$ is to be generated. If the exponent code is "100" for an input signal, then the exponent code indicates that $x^2$ is to be generated, then the second intermediate value is generated by shifting the binary log value a distance of one bit to the left, the first intermediate value is set to zero, and the combined value is produced by adding the second intermediate value to the first intermediate value.

In the sixth row, the exponent code "101" indicates that $x^3$ is to be generated. If the exponent code is "101" for an input signal, then the second intermediate value is generated by shifting the binary log value a distance of one bit to the left, the first intermediate value equated to the binary log value, and the combined value is produced by adding the second intermediate value to the first intermediate value.

In the seventh row, the exponent code "110" indicates that $x^4$ is to be generated. If the exponent code is "110" for an input signal, then the second intermediate value is generated by shifting the binary log value a distance of two bits to the left, the first intermediate value is set to zero, and the combined value is produced by adding the second intermediate value to the first intermediate value.

In the eight row, the exponent code "111" indicates that $x^5$ is to be generated. If the exponent code for an input signal is "111", then the second intermediate value is generated by shifting the binary log value a distance of two bits to the left, the first intermediate value is equated to the binary log value, and the combined value is produced by adding the second intermediate value to the first intermediate value.

Figure 5:
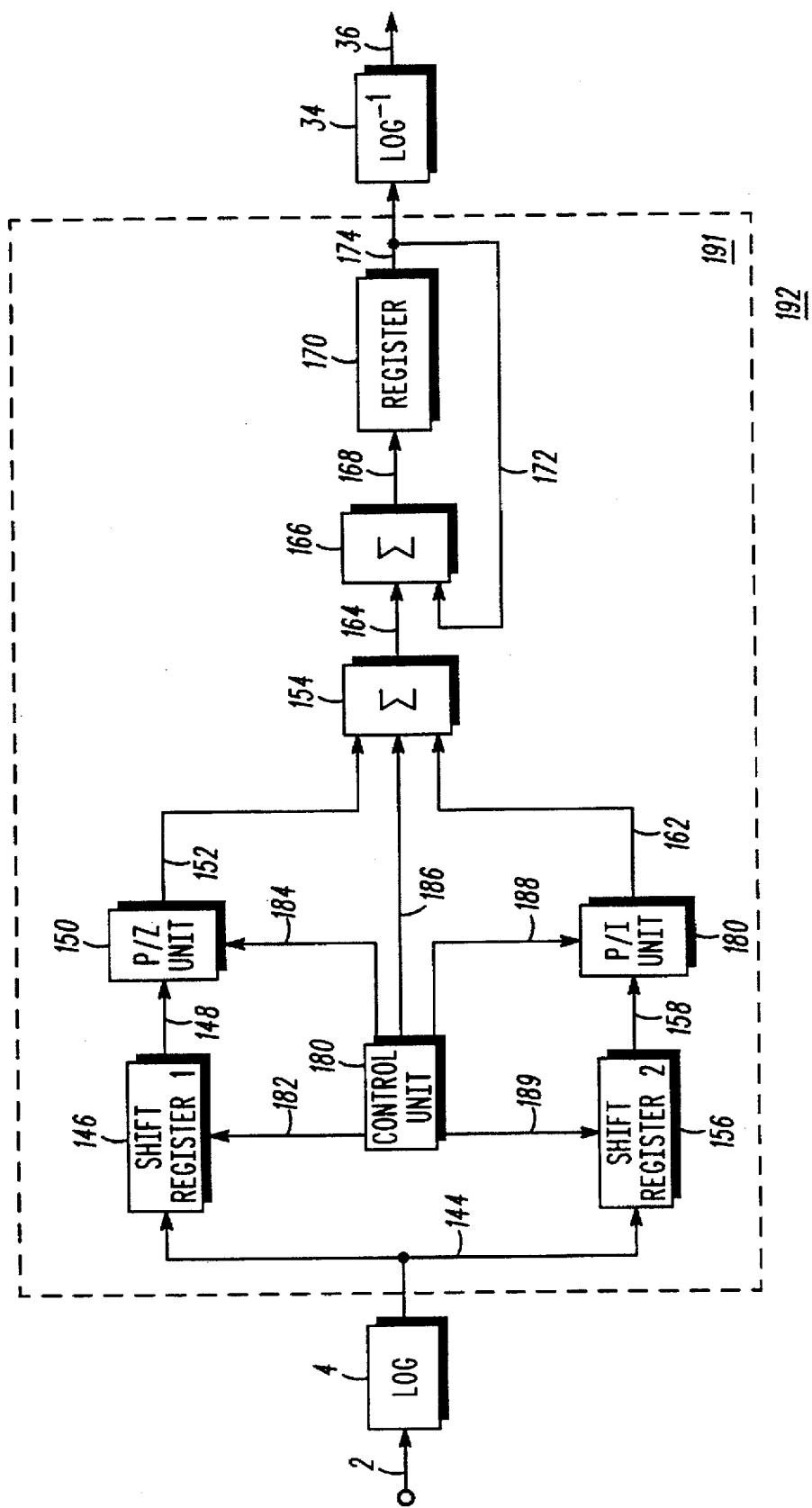
FIG. 5 illustrates a block diagram of an exponentiation circuit in accordance with a further embodiment of the present invention.

FIG. 5 illustrates a block diagram of an exponentiation circuit 192 in accordance with a further embodiment of the present invention. The exponentiation circuit 192 performs the same function as the exponentiation circuit 100 shown in FIG. 2 in that it computes a term which includes one or more exponential signals. However, exponentiation circuit 192 includes an second adder circuit 166, and thus requires only one addition cycle per input signal. Although the exponentiation circuit 192 of FIG. 5 may be faster than the exponentiation circuit 100 of FIG. 2, it consumes more space when implemented as an integrated circuit.

The exponentiation circuit 192 comprises a log circuit 4, a compute element 191, and an inverse-log circuit 34. The compute element 191 includes a P/I unit 160, a P/Z unit 150, a first shift register 146, a second shift register 156, a first adder circuit 154, a second adder circuit 166, a register 170, and a control unit 180.

The log circuit 4 receives one or more input signals on its input 2 and converts each input signal to a binary log value which has a plurality of bits. The binary log value is then distributed by bus 144 to the first shift register 146 and the second shift register 156. Upon receiving a binary log value, the first shift register 146 performs an arithmetic shift on the input to generate a first intermediate value on bus 148. The distance of the shift is determined by a first shift signal 182 which is produced by the control unit 180. The second shift register 156 performs an arithmetic shift on the input it receives on bus 144, whereby generating a second intermediate value on bus 158. The distance of the shift is determined by a second shift signal 189 which is produced by the control unit 180.

After receiving an input on bus 158, the P/I unit either passes the binary log value to a bus 162 or inverts the binary log value and then passes the inverted value to the bus 162. The function of the P/I unit 160 is determined by a second control signal 188 which is provided by the control unit 180. The P/Z unit 150 either passes the binary log value or zero to bus 152, depending on the value of a first control signal 184 which is provided by the control unit 180.

The first adder circuit 154 sums the outputs of the P/Z unit 150 and the P/I unit 160 which are provided on the buses 152,162. The output 164 of the first adder circuit 154 is fed to the second adder circuit 166. The second adder circuit 166 also receives the output of the register 170 on feedback bus 172 and generates a resultant sum which is provided to register 170 on output 168. The inverse-log circuit 34 generates a term representing one or more exponential signals on output 36 by performing an inverse-logarithmic conversion on the sum provided by the register 170 on output 174.

The control unit 180 typically stores a plurality of exponent codes (not shown), where each exponent code corresponds to an input signal. As each input signal is received by the exponentiation circuit 192, the control unit 180 decodes a corresponding code to generate the first and second control signals 184, 188; the first and second shift signals 182, 189; and carry bit 186.

In operation, the exponentiation circuit 192 can compute an exponent signal for a single input signal or a term which includes a plurality of exponent signals computed from a sequence of input signals. In either case, computing an exponent signal from a single input signal requires only one addition cycle.

Figure 6:
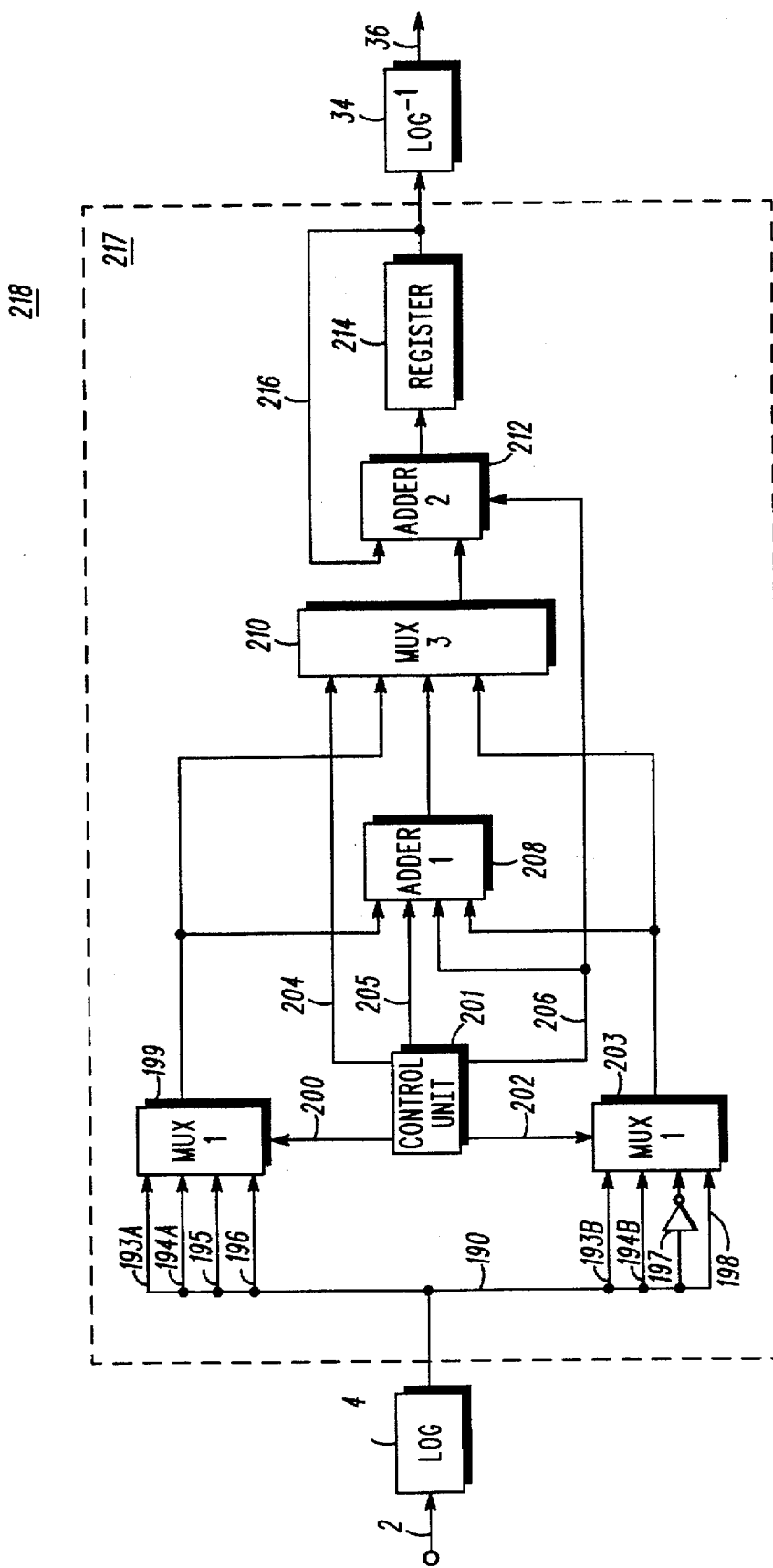
FIG. 6 illustrates a block diagram of an exponentiation circuit in accordance with a preferred embodiment of the present invention.

FIG. 6 illustrates a block diagram of an exponentiation circuit in accordance with a preferred embodiment of the present invention. The preferred exponentiation circuit 218 performs the same function as the exponentiation circuits 100, 192 shown in FIGS. 2 and 5 in that it computes a term which includes one or more exponential signals. Moreover, like the exponentiation circuit 192 shown in FIG. 5, the exponentiation circuit 218 of the preferred embodiment requires only one addition cycle per input signal. However, in contrast to the exponentiation circuit 192 of FIG. 5, the preferred exponentiation circuit 218 uses multiplexers instead of shift registers and thus requires less power and silicon space than the exponentiation circuit 192 of FIG. 5.

The exponentiation circuit 218 comprises a log circuit 4, a compute element 217, and an inverse-log circuit 34. The compute element 217 includes a first multiplexer 199, a second multiplexer 203, a third multiplexer 210, a first adder circuit 208, a second adder circuit 212, a register 214, and a control unit 201.

The log circuit 4 receives one or more input signals on its input 2 and converts each input signal to a binary log value which has a plurality of bits. The binary log value is then distributed by a bus 190 to the first multiplexer 199 and the second multiplexer 203. Each multiplexer selects from one of four inputs. Both the first and second multiplexers are provided a pass input 193a–b and a zero input 194a–b. In addition, the first multiplexer 199 receives a 1-bit shift left input 195 and a 1-bit shift right input 196; while the second multiplexer 203 receives an inverted input 197 and a 2-bit shift left input 198. The inputs to the first and second multiplexers 199, 203 are respectively selected according to a first mux signal 200 and a second mux signal 202.

The various inputs to the first and second multiplexers 199, 203 comprise different bit slices of the binary log value. For instance, the pass input 193a–b is simply the binary log value, whereas the zero input 194a–b is a binary word with all of its bits set to zero. On the other hand, the 1-bit shift left input 195 effectively provides the binary log value having been shifted one bit to the left. This is accomplished by connecting the right-most n–1 bits of the bus 192 to the left-most n–1 bits of the multiplexer input, where n is the number of bits in the binary log value. Zero is provided to the least significant bit (right-most bit) of the multiplexer input. The 2-bit shift left input 198 effectively provides the binary log value having been shifted two bits to the left. This is accomplished by connecting the right-most n–2 bits of the bus 192 to the left-most n–2 bits of the multiplexer input. Zero is provided to the two least significant bits of the multiplexer input. The 1-bit shift right input 196 effectively provides the binary log value having been shifted one bit to the right. This is accomplished by connecting the left-most n–1 bits of the bus 192 to the right-most n–1 bits of the multiplexer input. Zero is provided to the most significant bit (left-most bit) of the multiplexer input. The inverted input 197 is created by inverting the bits of the binary log value. This provides the 1's-complement form of the binary log value.

The first adder circuit 208 sums the outputs of the first and second multiplexers 199, 203. The first adder 154 is also responsive to a carry bit 206 and an adder enable signal 205. The output of the first adder 208 is fed to the third multiplexer 210. The third multiplexer 210 selects either the output of the first multiplexer 199, second multiplexer 203, or first adder circuit 208 according to a third mux signal 204 which is generated by the control unit 201.

The second adder 212 sums the outputs of the third multiplexer 210 and a stored value which is provided on a feedback path 216. The output of the second adder circuit 212 is stored in register 214. Initially, the register 214 can be pre-loaded with a value, such as a coefficient value or zero. The output of the register 214 is provided to the feedback path 216 and the inverse-log converter 34. The inverse-log circuit 34 generates a term representing one or more exponential signals on output 36 by performing an inverse-logarithmic conversion on the sum provided by the register 214.

The control unit 201 typically stores a plurality of exponent codes (not shown), where each exponent code corresponds to an input signal. As each input signal is received by the exponentiation circuit 218, the control unit 201 decodes a corresponding code to generate the first, second, and third mux signals 200, 202, and 204; the adder enable signal 205; and the carry bit 206. However, in another version of the present invention, the exponent codes are provided by a means of generating the codes which is connected to the control unit 201 and yet separate from the exponentiation circuit 218, such as a separate memory for storing the exponent codes or a host processor, e.g. a microprocessor connected to the circuit 218.

In operation, the exponentiation circuit 218 can compute an exponent signal for a single input signal or a term which includes a plurality of exponent signals computed from a sequence of input signals. In either case, computing an exponent signal from a single input signal requires only one addition cycle.

In one embodiment of the present invention, the exponentiation circuits 40, 100, 192, or 218 may be used to implement a term of which the general form is represented by Equation 1 as follows:

$$y = w * x_1^{g_1} * x_2^{g_2} \cdots x_n^{g_n} \qquad \text{Equation (1)}$$

where $x_i$ represent the input signals received on input 2 and can be a function such as $x_i = f_i(z_j)$, where $z_j$ is any arbitrary variable, and where the indices i and j may be any integers; where y represents the output 36 of the exponentiation circuit; where w represents the coefficient value; where $g_1$, ..., $g_n$ represent the exponents for the term; and n is the number of inputs.

FIG. 7 is a table illustrating examples of exponent codes which can be used with the exponentiation circuit of FIG. 6. The table lists the codes and their corresponding mux signals which are used in the preferred embodiment of the present invention. The table also illustrates the values of the carry bit 206 and adder enable signal 205 generated in response to the each of the exponent codes. Each row in the table gives the values of the signals and the carry bit corresponding to one of the exponent codes.

For example, in the first row, the exponent code "000" indicates that $x^{-1}$ is to be generated by exponentiation circuit 218. If the exponent code for an input signal is "000", then the first mux signal 200 is a don't care, the second mux signal 202 is set to select the inverted input 197, the adder enable signal is set to zero, thus disabling the first adder 208, the third mux signal 204 is set to select the output of the second multiplexer 203, and the carry bit 206 is set to one. In effect, the 2's-complement form of the binary log value is generated by the second adder circuit 212.

In the second row, the exponent code "001" indicates that $x^{-\frac{1}{2}}$ is to be generated. If the exponent code is "001" for an input signal, then the first mux signal 200 is set to select the 1-bit shift right input 196, the second mux signal 202 is set to select the inverted input 197, the adder enable signal 205 is set to one, thus enabling the first adder 208, the third mux signal 204 is set to select the output of the first adder 208, and the carry bit 206 is set to one for the first adder 208 and zero for the second adder 212.

In the third row, the exponent code "010" indicates that $x^{1/2}$ is to be generated. If the exponent code is "010" for an input signal, then the first mux signal 200 is set to select the 1-bit shift right input 196, the second mux signal 202 is a don't care, the adder enable signal 205 is set to zero, the third mux signal 204 is set to select the output of the first multiplexer 199, and the carry bit 206 is set to zero.

In the fourth row, the exponent code "011" indicates that $x^1$ is to be generated. If the exponent code is "011" for an input signal, then the first mux signal 200 is set to select the pass input 193a, the second mux signal 202 is a don't care, the adder enable signal 205 is set to zero, the third mux signal 204 is set to select the output of the first multiplexer 199, and the carry bit 206 is set to zero.

In the fifth row, the exponent code "100" indicates that $x^2$ is to be generated. If the exponent code is "100" for an input signal, then the first mux signal 200 is set to select the 1-bit shift left input 195, the second mux signal 202 is a don't care, the adder enable signal 205 is set to zero, the third mux signal 204 is set no select the output of the first multiplexer 199, and the carry bit 206 is set to zero.

In the sixth row, the exponent code "101" indicates that $x^3$ is to be generated. If the exponent code is "101" for an input signal, then the first mux signal 200 is set to select the 1-bit shift left input 195, the second mux signal 202 is set to select the pass input 193b, the adder enable signal 205 is set to one, thus enabling the first adder 208, the third mux signal 204 is set to select the output of the first adder 208, and the carry bit 206 is set to zero.

In the seventh row, the exponent code "110" indicates that $x^4$ is to be generated. If the exponent code is "110" for an input signal, then the first mux signal 200 is a don't care, the second mux signal 202 is set to select the 2-bit shift left input 198, the adder enable signal 205 is set to zero, the third mux signal 204 is set to select the output of the second multiplexer 203, and the carry bit 206 is set to zero.

In the eighth row, the exponent code "111" indicates that $x^5$ is to be generated. If the exponent code for an input signal is "111", then the first mux signal 200 is set to select the pass input 193a, the second mux signal 202 is set to select the 2-bit shift left input 198, the adder enable signal 205 is set to one, the third mux signal 204 is set to select the output of the first adder 208, and the carry bit 206 is set to zero.

An exponent code may also be provided to indicate that $x^0$ is to be generated. Although such a code is not shown in FIG. 7, it could be easily implemented by providing an additional exponent code, such as "1000", which when decoded causes the first mux signal 200 to select the zero input 194b, the adder enable signal 205 to be zero, the third mux signal to select the output of the first multiplexer 199, and the carry bit to be zero. The second mux signal 202 is a don't care.

Figure 8:
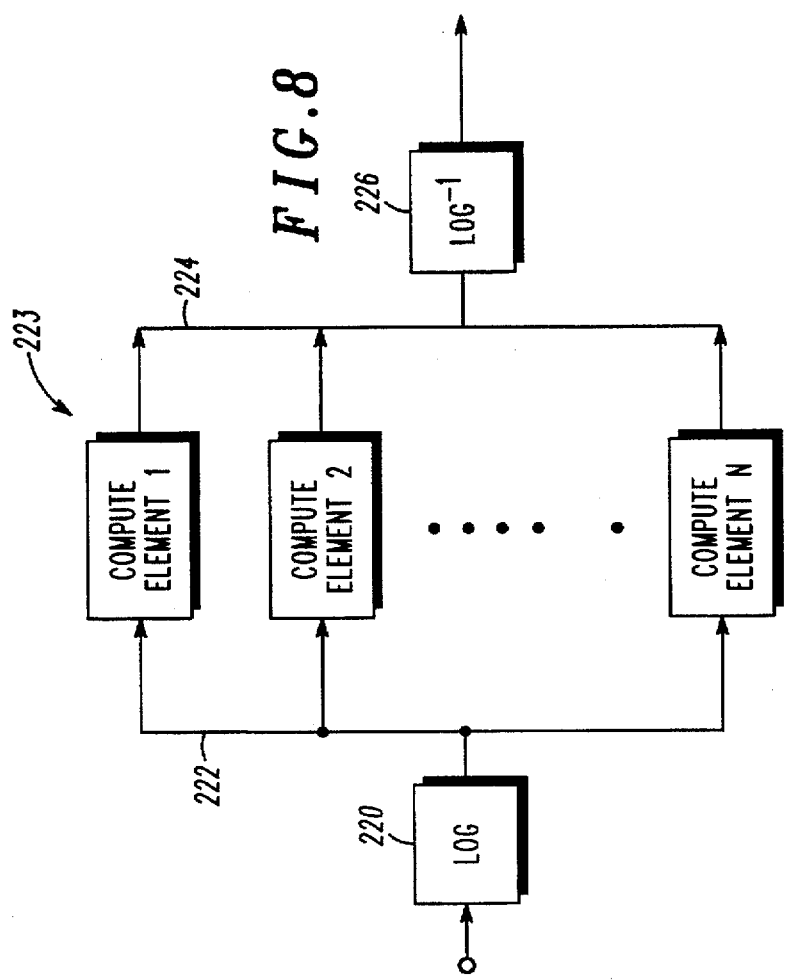
FIG. 8 illustrates a block diagram of an exponentiation circuit which includes a plurality of compute elements.

FIG. 8 illustrates a block diagram of an exponentiation circuit which includes a plurality of compute elements. Like the other embodiments to the present invention. the exponentiation circuit of FIG. 8 computes a term which includes one or more exponential signals. This embodiment of the exponentiation circuit includes a log converter 220, a plurality of compute elements 223, and an inverse-log converter 226. The log converter 220 receives one or more input signals on its input and converts each input signal to a binary log value which has a plurality of bits. The binary log value is then distributed by a bus 222 to each of the plurality of compute elements. The outputs of the compute elements are then passed across a bus 224 to the inverse-log converter 226. The inverse-log converter 226 generates a term representing one or more exponential signals on output 36 by performing an inverse-logarithmic conversion on the outputs generated by the plurality of compute elements 223.

The plurality of compute elements may include any of the compute elements 9, 99, 191, 217 depicted in FIGS. 1, 2, 5, and 6.

The exponentiation circuit of the present invention and its various embodiments, which are shown in FIGS. 1, 2, 5, 6, and 8 are preferably implemented with integrated circuits. However, one of ordinary skill in the art will recognize that a programmable logic array or other digital logic device, such as a microprocessor executing software, could also be used to implement the functions performed by the various embodiments of the exponentiation circuit of the present invention.

Figure 9:
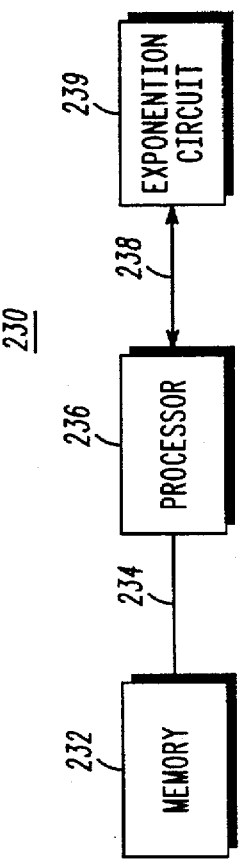
FIG. 9 illustrates a block diagram of a computer system which includes an exponentiation circuit that conforms with an embodiment of the present invention.

FIG. 9 illustrates a block diagram of a computer system which includes an exponentiation circuit which conforms with an embodiment of the present invention. The computer system 230 comprises a memory 232, a processor 236, and an exponentiation circuit 239. The memory 232 stores programs and data which are used by the processor 236. In operation, the processor 236 fetches program instruction from the memory 232 using bus 234. As a result of executing the program instructions, the processor 236 transmits input signals to the exponentiation circuit 239 and subsequently retrieves at least one exponent value from the output of the exponentiation circuit 239. All communication between the processor 236 and the exponentiation 239 take place over a bus 238. The exponentiation circuit 239 may include any of the exponentiation circuits 40, 100, 192, or 218 depicted in FIGS. 1, 2, 5, and 6, respectively.

Figure 10:
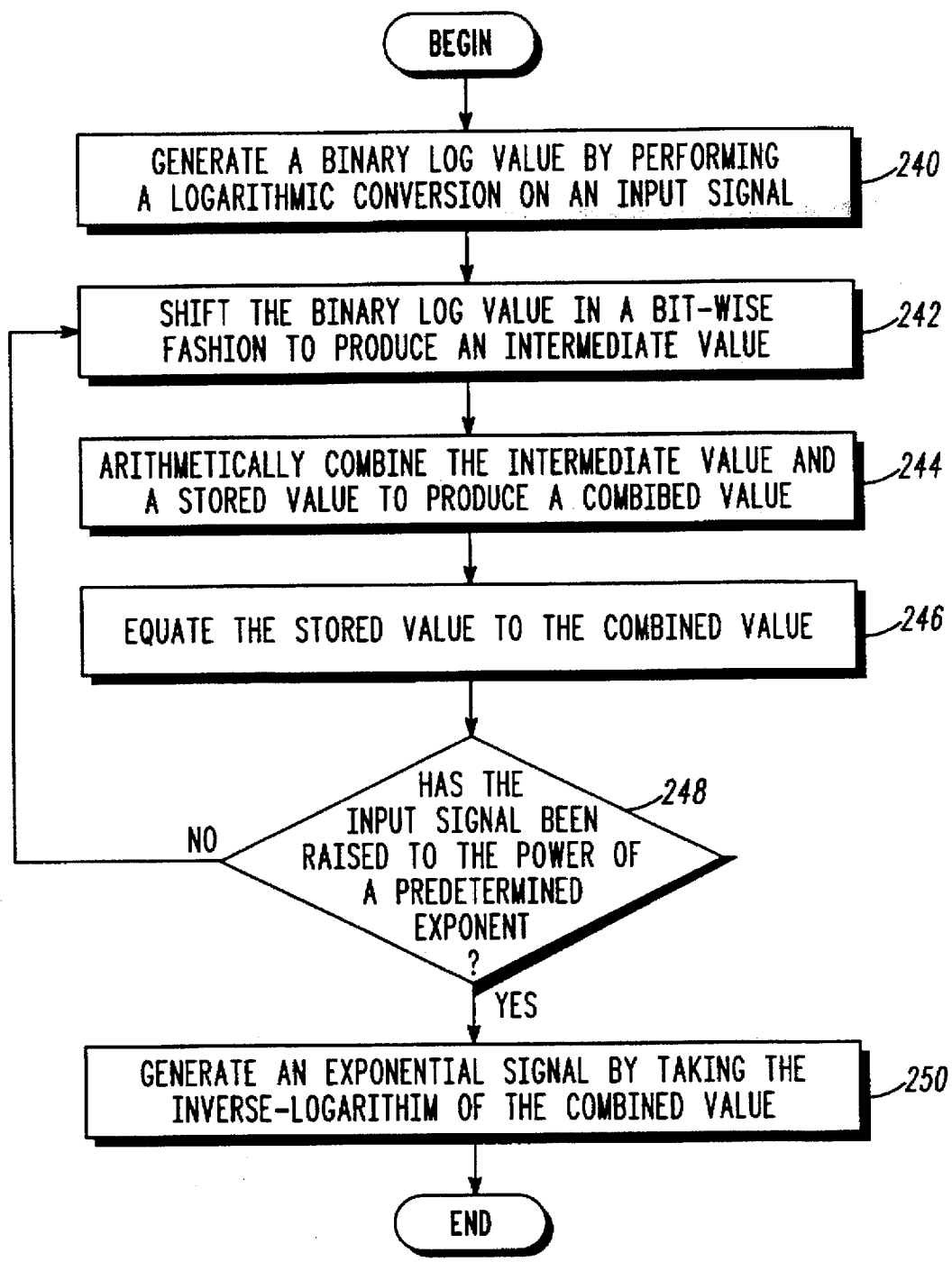
FIG. 10 illustrates a flow diagram of a method of generating an exponential signal from an input signal.

FIG. 10 illustrates a flow diagram of a method of generating a exponential signal from an input signal. Such a method could be used in an exponentiation circuit having an input signal x and generating an exponential signal $x^g$.

In box 240, a binary log value having a plurality of bits is generated by performing a logarithmic conversion on the input signal.

In box 242, a plurality of bits of the binary log value are shifted to generate an intermediate value. The shifting operation is equivalent to multiplying the binary log value by a factor which is a power of two.

Next, in box 244, the intermediate value is arithmetically combined with a stored value to produce a combined value. The two values may be combined by either adding the intermediate value to the stored value, or subtracting the intermediate value from the stored value.

In box 246, the stored value is equated to the combined value. In decision box 248, a check is made to determine whether the input signal has been raised to the power of a predetermined exponent. The predetermined exponent is an exponent, g, which is based on an exponent code stored in a control unit of an exponentiation circuit. If the input signal has been raised to the predetermined exponent, the method proceeds to box 250. If not, the method returns to box 242.

In box 250, the exponential signal $x^g$ is generated by performing an inverse-logarithmic conversion on the combined value.

FIG. 11 illustrates a flow diagram of a method of generating a term which includes a plurality of exponential signals generated from a sequence of input signals. This method may be used in an exponentiation circuit having a sequence of inputs $x_i$ to generate a term having a plurality of exponential signals $x_i g_i$, where i is an integer.

In box 260, a first input of the sequence of inputs is received. In turn, in box 262, a binary log value having a plurality of bits is generated by performing a logarithmic conversion on the first input.

In box 264, an exponent code is decoded to produce a first shift signal and a second shift signal. In box 266, the first shift signal is applied to the binary log value to produce a first intermediate value. The first intermediate value may be produced by either shifting the plurality of bits of the binary log value, or by equating the first intermediate value to the binary log value.

In box 268, the second shift signal is applied to the binary log value to produce a second intermediate value. The second intermediate value may be produced by either shifting the plurality of bits of the binary log value; by equating the second intermediate value to the binary log value; or by setting the second intermediate value to zero.

Next, in box 270, the first intermediate value is arithmetically combined with the second intermediate value to produce a combined value. The combined value is produced by either adding the first intermediate value to the second intermediate value, or subtracting the first intermediate value from the second intermediate value. The combined value is then added to a stored value to produce a sum.

In decision box 272, a check is made to determine whether all of the sequence of inputs have been received. If so, the method proceeds to box 276. If not, the method proceeds to box 274.

In box 274, a next input is received from the sequence of input signals. Then, the first input is equated to the next input and the stored value is equated to the sum. The method then returns to box 262.

Finally, in box 276, the term is generated by performing an inverse-logarithm conversion on the sum.

In summary, the present invention as herein-disclosed provides an exponentiation circuit which uses at least one shift register to obtain a power of two multiple of a binary log value. This significantly increases the data throughput rate of the circuit.

Also, the present invention provides an exponentiation circuit which uses an adder circuit, thereby reducing the power and space required by the exponentiation.

A further advantage of the present invention is to provide an exponentiation circuit which uses all digital circuitry, thus making it economical to implement and easy to integrate with a microprocessor core or other digital logic on a single chip.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a circuit having an input signal, a method for generating an exponential signal, the method comprising the following steps:

converting the input signal into a binary log value having a plurality of bits;

shifting the plurality of bits of the binary log value to generate an intermediate value;

subtracting a stored value from the intermediate value prior to performing the inverse-logarithmic conversion to produce a combined value; and generating the exponential signal by performing an inverse-logarithmic conversion on the combined value.

2. A method for generating an exponential signal, the method comprising the following steps:

converting an input signal into a binary log value having a plurality of bits;

shifting the plurality of bits of the binary log value to generate an intermediate value;

adding a stored value to the intermediate value to produce a combined value; and generating the exponential signal by performing an inverse-logarithmic conversion on the combined value.

3. An exponentiation circuit, comprising:

means for performing logarithmic conversion on an input signal to produce a binary log value having a plurality of bits;

shift means for shifting the binary log value a distance of n-bits to generate an intermediate value, wherein n is an integer;

means for adding a stored value to the intermediate value to produce a combined value; and means for performing an inverse-logarithmic conversion on the combined value to produce the exponential signal.

4. The exponentiation circuit of claim 3, further comprising:

control means, operatively coupled to the shift means, for applying an exponent code to the shift means;

wherein the shift means shifts the binary log value according to the exponent code.

5. An exponentiation circuit, comprising:

a logarithm converter for performing logarithmic conversion on an input signal to produce a binary log value having a plurality of bits;

a shift register for shifting the binary log value a distance of n-bits to generate an intermediate value, wherein n is an integer;

an adder for adding a stored value to the intermediate value to produce a combined value; and an inverse-logarithm converter for performing an inverse-logarithmic conversion on the combined value to produce the exponential signal.

6. The exponentiation circuit of claim 5, further comprising:

a control unit, operatively coupled to the shift register, for applying an exponent code to the shift means;

wherein the shift register shifts the binary log value according to the exponent code.

7. An apparatus comprising:

a logarithm converter;

a binary shifting device responsive to the logarithm converter;

a summer responsive to the binary shifting device; and an inverse logarithm converter responsive to the summer.

8. An apparatus comprising:

a logarithm converter;

a first shift register responsive to the logarithm converter;

a second shift register responsive to the logarithm converter;

a summer responsive to the first and second shift registers; and an inverse logarithm converter responsive to the summer.

9. An apparatus comprising:

a logarithm converter;

a plurality of compute elements responsive to the logarithm converter, each of the plurality of compute elements comprising a digital shifting device and at least one of the plurality of compute elements comprising a summer; and an inverse logarithm converter responsive to the plurality of compute elements.

10. The apparatus of claim 9, wherein the digital shifting device comprises an arithmetic shift register.

11. The apparatus of claim 9, wherein each of the plurality of compute elements further comprises a summer.

12. The apparatus of claim 9, wherein at least one of the plurality of compute elements further comprises a register.

13. An apparatus comprising:

a logarithm converter;

a multiplexer responsive to the logarithm converter;

an adder responsive to the multiplexer; and an inverse logarithm converter responsive to the adder.

14. The apparatus of claim 13, further comprising a second multiplexer responsive to the logarithm converter.

15. The apparatus of claim 13, further comprising a memory responsive to the adder.

16. A method of processing an input signal comprising the following steps:

converting an input signal into a binary log value having a plurality of bits;

shifting the plurality of bits of the binary log value to generate an intermediate value;

producing a combined value based on the intermediate value and a stored value; and performing an inverse-logarithmic conversion on the combined value.

* * * * *